United States Patent
Vavrick

(10) Patent No.: US 9,268,334 B1
(45) Date of Patent: Feb. 23, 2016

(54) AUTOMATED GUIDED CART SYSTEM CONTROL

(71) Applicant: GM GLOBAL TECHNOLOGY OPERATIONS LLC, Detroit, MI (US)

(72) Inventor: Paul H. Vavrick, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/457,440

(22) Filed: Aug. 12, 2014

(51) Int. Cl.
*B60T 7/16* (2006.01)
*G05D 1/02* (2006.01)
*G05B 19/418* (2006.01)
*B60L 11/18* (2006.01)

(52) U.S. Cl.
CPC .......... *G05D 1/0225* (2013.01); *B60L 11/1822* (2013.01); *B60L 11/1861* (2013.01); *G05B 19/41895* (2013.01); *G05D 1/0217* (2013.01)

(58) Field of Classification Search
CPC ............ B60L 11/1822; B60L 11/1851; B60L 11/1809; B60L 11/1861
USPC .................................... 180/168, 12
See application file for complete search history.

(56) References Cited

U.S. PATENT DOCUMENTS

| | | | | |
|---|---|---|---|---|
| 3,245,493 A * | 4/1966 | Barrett, Jr. | ........... | G05D 1/0265 180/168 |
| 3,482,644 A * | 12/1969 | Krieger | ........... | B62D 1/28 180/168 |
| 3,612,206 A * | 10/1971 | Ohntrup | ........... | G05D 1/0265 180/168 |
| 3,912,037 A * | 10/1975 | Krieg | ........... | B62D 1/26 180/168 |
| 4,044,853 A * | 8/1977 | Melke | ........... | G05D 1/0265 180/167 |
| 4,729,449 A * | 3/1988 | Holmquist | ........... | B62D 1/28 180/168 |
| 6,445,984 B1 * | 9/2002 | Kellogg | ........... | B62D 1/28 318/587 |
| 6,621,516 B1 * | 9/2003 | Wasson | ........... | H04N 7/185 348/36 |
| 6,721,638 B2 * | 4/2004 | Zeitler | ........... | G05D 1/0261 180/408 |
| 6,904,343 B2 * | 6/2005 | Kang | ........... | G05B 19/41895 318/568.12 |
| 7,044,703 B2 * | 5/2006 | Fukuda | ........... | H01L 21/67294 414/416.03 |
| 7,090,042 B2 * | 8/2006 | Coveyou | ........... | B62D 51/04 180/19.2 |
| 7,400,486 B2 * | 7/2008 | Stewart | ........... | H05F 3/025 361/219 |
| 7,905,304 B2 * | 3/2011 | Adachi | ........... | B66F 9/063 180/12 |
| 2003/0070622 A1 * | 4/2003 | Vaags | ........... | A01K 61/02 119/51.11 |
| 2004/0251870 A1 * | 12/2004 | Ueda | ........... | B60L 11/1809 320/104 |
| 2006/0052676 A1 * | 3/2006 | Wang | ........... | A61B 5/0006 600/300 |
| 2006/0169415 A1 * | 8/2006 | Lawson | ........... | B60C 25/132 157/1.1 |
| 2006/0276958 A1 * | 12/2006 | Crumbaugh | ........... | G05D 1/027 701/532 |
| 2007/0029124 A1 * | 2/2007 | DasGupta | ........... | B60L 3/0046 429/218.1 |
| 2008/0140253 A1 * | 6/2008 | Brown | ........... | B65F 1/1473 700/245 |
| 2008/0199298 A1 * | 8/2008 | Chilson | ........... | B60L 15/2036 414/809 |
| 2008/0269299 A1 * | 10/2008 | Beussink | ........... | A01N 51/00 514/341 |
| 2010/0266381 A1 * | 10/2010 | Chilson | ........... | B66F 9/063 414/809 |

* cited by examiner

*Primary Examiner* — Hau Phan

(57) ABSTRACT

A method of operating an automated guided cart may include directing, using a controller, the cart on a production operation path; automatically detecting a state-of-charge in an onboard battery pack; signaling to a remote station the state-of-charge; and when the state-of-charge is below a predetermined charge limit, the remote station automatically signaling the cart to automatically veer from the production operation path to a low battery charge path and stop at a battery station.

12 Claims, 2 Drawing Sheets

AUTOMATED GUIDED CART SYSTEM CONTROL

BACKGROUND OF INVENTION

The present invention relates generally to automated guided cart systems, and more particularly to control of such systems.

Automated guided carts may be employed in factories to move items from one location to another. These carts operate autonomously without a human operator driving the cart. Such carts may use batteries to power an electric motor to propel the cart. However, in such operating conditions, there may be times when the batteries of a particular cart are discharged during use, thus stranding the cart. This may result in lost production at the factory. Some attempts at solutions to this concern, for example buying more expensive equipment/ batteries or employing automatic charging pads, may be more expensive than desired.

SUMMARY OF INVENTION

An embodiment contemplates a method of operating an automated guided cart that includes: directing, using a controller, the cart on a production operation path; automatically detecting a state-of-charge in an on-board battery pack; signaling to a remote station the state-of-charge; and when the state-of-charge is below a predetermined charge limit, the remote station automatically signaling the cart to automatically veer from the production operation path to a low battery charge path and stop at a battery station.

An embodiment contemplates an automated guide cart system including: an automated guided cart including an on-board battery pack, an on-board controller that directs the cart on a production operation path and automatically detects a state-of-charge in the on-board battery pack, and an on-board transceiver to transmit a signal relating to a state-of-charge of the on-board battery pack; a stationary remote station having a stationary transceiver to communicate with the on-board transceiver, and a controller to direct the cart, via a signal from the stationary transceiver, to continue on the production operation path or to steer onto a low battery charge path when the state-of-charge of the battery is below a predetermined threshold.

An advantage of an embodiment is that automated guide carts, during normal operation, may be automatically routed offline for battery replacement when low battery charge is detected. This may help reduce or eliminate downtime of such carts due to discharged batteries. Also, the cart is moved to a location that allows for quick battery replacement.

DETAILED DESCRIPTION

Figure 1:
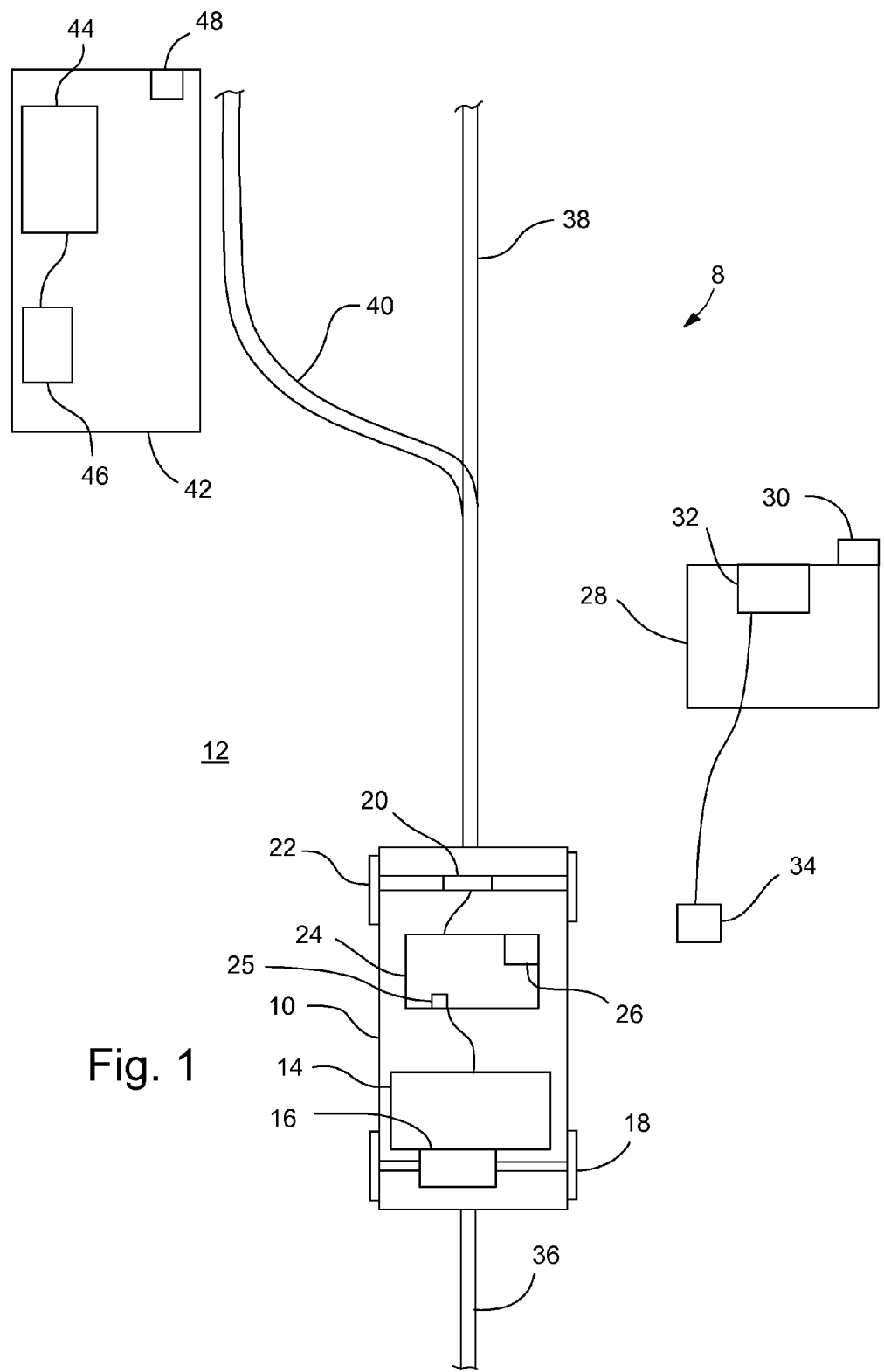
FIG. 1 is a schematic of an automated guided cart system and control in a factory.

Referring to FIG. 1, an automated guide cart system 8 includes an automated guided cart 10 that is shown on a factory floor 12. The cart 10 may include a battery pack 14 that powers an electric motor 16, which drives wheels 18, and an automated steering assembly 20 that steers another set of wheels 22. The cart 10 may also include a controller 24 that is in communication with the steering assembly 20, battery pack 14 and motor 16. The controller 24 may be in communication with a battery charge detector 25, which can detect the state-of-charge of the battery pack 14. The detector 25 may any one of a number of devices that can detect the state-of-charge of a battery, as are known to those skilled in the art. The cart 10 may also include an on-board transceiver 26 for communication between the controller 24 and a remote station 28 mounted at a location on the floor 12.

The remote station 28 may include a power supply 30, which may be the electrical power supply in the factory, and a controller 32, which is in communication with a transceiver 34 that communicates with the on-board transceiver 26. The transceivers 26, 34 may communicate with each other, by transmitting data by, for example, infrared or radio transmission, as the two transceivers 26, 34 pass close to one another along a guide path 36 that the cart 10 follows.

The guide path 36 may be, for example, a magnetic tape that is secured to the floor 12. The guide path 36 is the path along which the cart 10 travels while conducting production operations to deliver parts (or other activities) around the factory floor 12. At a location on the floor 12, the guide path 36 may fork into continuing on a production operation path 38, where the cart 10 continues on the path to deliver parts, assemblies, etc. associated with regular duties in the plant, or a low battery charge path 40, which directs the cart 10 to a battery station 42.

The battery station 42 may include one or more spare battery packs 44, and may include a battery charger 46. If this location includes the battery charger 46, it may be used to charge the spare battery packs 44 and/or the battery pack 14 on the vehicle, as the particular situation may warrant. The battery station 42 may also include some type of battery change indicator 48 that can be used to notify a factory worker that the cart 10 is at the station 42 and needs a battery change or recharge.

Figure 2:
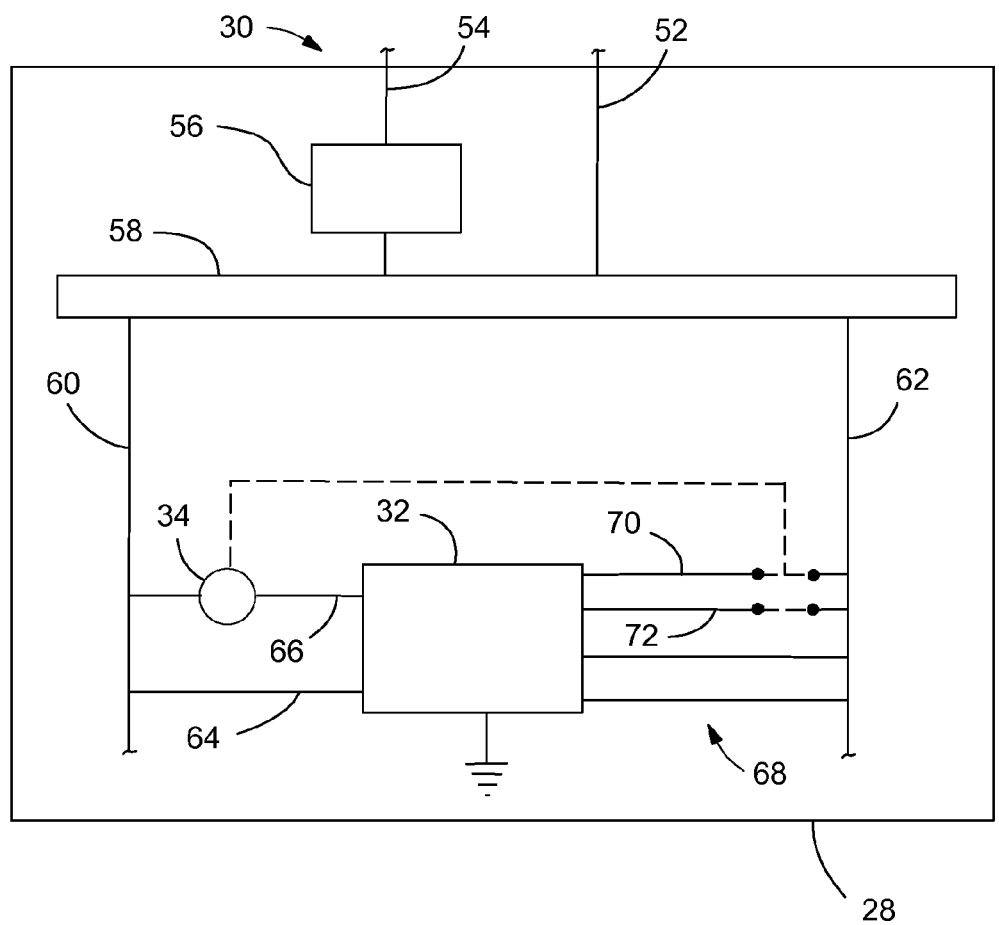
FIG. 2 is a schematic figure of a remote station employed with an automated guided cart system.

FIG. 2 illustrates an example of how the remote station 28 may be configured. The power supply 30 may include a neutral line 52 and a one hundred twenty volt supply line 54, with a circuit breaker 56, the supply line supplying power to a power supply converter 58. The power supply converter 58 may convert the power to, for example, twenty four volts, with a power line 60 and a common line 62. The controller 32 may have various inputs—for example, there may be a power input 64 and an input 66 from the transceiver 34. The controller 32 may also have outputs 68. One output 70 may be a normal condition output that outputs a high signal when the battery condition is sufficiently charged. Another output 72 may be a battery low condition output that outputs a high signal when a low battery charge is reported.

The operation of the automated guide cart system 8 will now be described with reference to FIGS. 1 and 2. As the cart 10 travels around the factory floor 12 along the guide path 36, moving parts or performing other automated operations, the on-board controller 24 monitors the state-of-charge of the on-board battery pack 14. As the cart 10 passes the transceiver 34 of the remote station 28, if the battery pack charge is low, the on-board transceiver 26 will signal the low charge state, via the stationary transceiver 34, to the remote station 28. The output of the controller 32 will signal, via transceiver 34, for the controller 24 to either continue to steer the cart 10 along the production operation path 38, if the battery charge is adequate, or steer the cart 10 onto the low battery charge path 40, if the charge of the on-board battery pack 14 is low. This, in effect, acts similar to an automated railroad switch to switch along which path the cart 10 will travel, without needed any human intervention. On the low battery charge path 40, the cart 10 will then pull alongside the battery station 42 for replacement of the battery pack 14 with a charged spare battery pack 44. The battery charge indicator 48, if there is one, may be activated in order to alert a factory worker that a battery change is needed. Or, the battery station 42 may be located on the factory floor 12 close to a work station so that a worker close by will naturally notice when a cart 10 pulls into the station due to a low battery charge. The battery pack 14 may then be swapped out for the spare battery pack 44, and the cart 10 activated to return to the production operation path 38 to continue with its operations on the factory floor 12.

How low the battery pack charge is before the cart 10 is directed to the battery station depends upon the particular situation in which the cart is used and the battery packs being used. Thus, a predetermined charge limit threshold for low battery charge can be empirically determined.

While certain embodiments of the present invention have been described in detail, those familiar with the art to which this invention relates will recognize various alternative designs and embodiments for practicing the invention as defined by the following claims.

The invention claimed is:

1. A method of operating an automated guided cart, the method comprising the steps of:
   (a) directing, using a controller, the cart on a production operation path;
   (b) automatically detecting a state-of-charge in an on-board battery pack;
   (c) signaling to a remote station the state-of-charge; and
   (d) when the state-of-charge is below a predetermined charge limit, the remote station automatically signaling the cart to automatically veer from the production operation path to a low battery charge path and stop at a battery station.

2. The method of claim 1 further comprising: (e) when the cart arrives at the battery station, activating a battery change indicator.

3. The method of claim 2 further comprising: (e) swapping the on-board battery pack for a spare battery pack at the battery station, and (f) activating the cart to return to the production operation path.

4. The method of claim 1 further comprising: (e) swapping the on-board battery pack for a spare battery pack at the battery station, and (f) activating the cart to return to the production operation path.

5. The method of claim 1 wherein step (a) is further defined by the controller being located on-board of the cart.

6. The method of claim 1 wherein step (b) is further defined by the state-of-charge of the battery pack being determined on-board the cart.

7. The method of claim 1 wherein step (c) is further defined by a transceiver on the cart communicating with a stationary transceiver in communication with the remote station.

8. The method of claim 7 wherein step (c) is further defined by the communication between the transceivers being via infrared transmissions.

9. The method of claim 7 wherein step (c) is further defined by the communication between the transceivers being via radio wave transmissions.

10. A method of operating an automated guided cart, the method comprising the steps of:
    (a) directing, using a controller, the cart on a production operation path;
    (b) automatically detecting a state-of-charge in an on-board battery pack;
    (c) wirelessly signaling to a remote station the state-of-charge;
    (d) when the state-of-charge is below a predetermined charge limit, the remote station automatically signaling the cart to automatically veer from the production operation path to a low battery charge path and stop at a battery station;
    (e) swapping the on-board battery pack for a spare battery pack at the battery station; and
    (f) activating the cart to return to the production operation path.

11. The method of claim 10 wherein step (c) is further defined by the communication between the transceivers being via infrared transmissions.

12. The method of claim 10 further comprising: (e) when the cart arrives at the battery station, activating a battery change indicator.

* * * * *